(No Model.)

J. H. THOMAS.
BABY WALKER.

No. 571,583. Patented Nov. 17, 1896.

WITNESSES:
Duncan M. Robertson.
Felicie Gartner

INVENTOR:
Joseph H. Thomas
BY Gartner & Co
ATTORNEYS

UNITED STATES PATENT OFFICE.

JOSEPH H. THOMAS, OF PATERSON, NEW JERSEY.

BABY-WALKER.

SPECIFICATION forming part of Letters Patent No. 571,583, dated November 17, 1896.

Application filed April 17, 1896. Serial No. 587,395. (No model.)

*To all whom it may concern:*

Be it known that I, JOSEPH H. THOMAS, a citizen of the United States, residing in Paterson, county of Passaic, and State of New Jersey, have invented certain new and useful Improvements in Baby-Walkers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide a baby-walker of simple, strong, and durable construction and which can be easily transformed into and used as a cradle, hammock-support, chair, or rocking-carriage.

The invention consists in the improved baby-walker and in the combination and arrangement of the various parts thereof, substantially as will be hereinafter more fully described, and finally embodied in the clauses of the claim.

Figure 1:
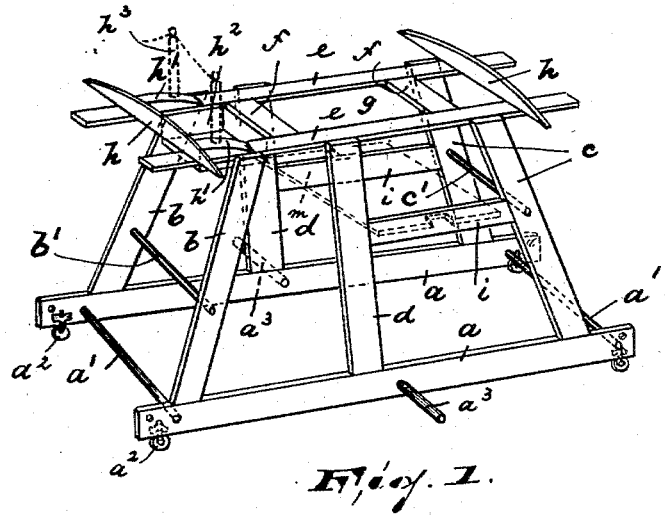
Figure 2:
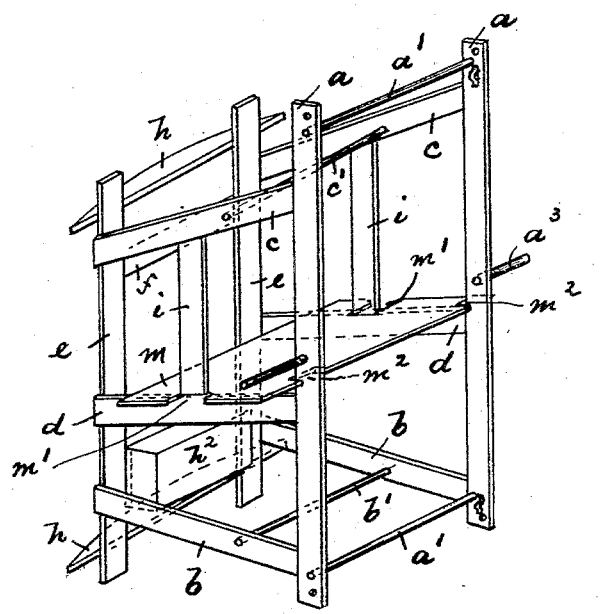

Referring to the accompanying drawings, in which like letters of reference indicate corresponding parts in each of the two figures, Figure 1 is a perspective view of my improved baby-walker; and Fig. 2, a perspective view of the same when used as a chair, the casters being removed.

In the said drawings, $a$ $a$ represent two parallel bars connected and strengthened by the cross-rods $a'$ and provided at or near each end with a caster $a^2$, thus forming the running-gear for the baby-walker. To the said bars $a$ $a$ are secured in any desired manner a series of upwardly and inwardly extending standards $b$ $b$, $c$ $c$, and $d$ $d$, connected at their upper ends by the shorter parallel bars $e$ $e$ and about midway by the cross-rods $b'$ $c'$, as clearly shown in the drawings. The standards $c$ and $d$ are connected by the supports $i$ $i$, while the bars $e$ $e$ are connected by the braces $f f$, parallel to the cross-rods $a'$, $b'$, and $c'$. At or near the ends of the upper bars $e$ $e$ are secured in any desired manner the segmental-shaped cross-pieces $h$ $h$, adapted to serve as rockers when said baby-walker is being used as a cradle, as will be hereinafter described. One of said cross-pieces $h$ is strengthened by the wedges or blocks $h'$, which are secured to the bars $e$. Between said wedges and the rocker $h$ and cross-piece $f$ is arranged a receptacle $h^2$, serving as a toy-box or as a foot-rest when the baby-walker is inverted. If desired, a series of holes are arranged in said wedges for the purpose of receiving standards $h^3$, as shown in dotted lines in Fig. 1, to be connected by a cord or string, from which toys can be suspended, as will be manifest.

On each outer side of the parallel bars $a$ and in about the middle thereof are secured, preferably by a screw-thread connection, the horizontally-projecting rods or arms $a^3$, which prevent the baby-walker from turning over and which may serve as racks for the child's clothes when it is being used as a chair, as in Fig. 2.

A board $m$, provided on its shorter sides with notches $m'$ $m'$ and at its front with notches $m^2$ $m^2$, adapted to engage certain cross-pieces of the baby-walker, forms a seat for the child and is removably arranged, so that it can be placed in the required position, as will be manifest.

It is evident that the baby-walker may be used as a chair when the board $m$ is in the position indicated in Fig. 1, as well as when said board is placed as shown in Fig. 2, the baby-walker in the latter instance standing on end.

When the board $m$ is removed, the child is placed in the space $g$, formed by the bars $e$ $e$ and braces $f f$, and by holding onto said bars can push or move the baby-walker in any direction.

When the board $m$ is placed in the position as shown in dotted lines in Fig. 1 it can be occupied by the child as a seat, having the toy-box $h^2$ in front of it.

By removing the seat and inverting the baby-walker until it rests on the rockers $h$ it can be used as a cradle, or by attaching in any desired manner a hammock to the cross-rods $a'$ as a hammock-support.

The cross-bars $b'$ $c'$ not only afford a means for strengthening the frame, but they may be used to support a board of sufficient length, which, being placed thereon when the inverted baby-walker is to be used as a cradle, may serve as a bottom therefor.

From the foregoing it can be seen that my improved baby-walker, although of very simple construction, can be used for various purposes without having its construction altered or changed.

Having thus described my invention, what I claim as new, and desire to secure by Letters Patent, is—

1. In a baby-walker, a frame comprising upright standards, pairs of parallel bars $a$, $e$, and cross-bars $a'$, $b'$, $c'$, joining said standards, transverse braces $f$ secured to two of said parallel bars and forming therewith a space $g$, a seat adapted to be supported by various parts of the frame, and segmental pieces or rockers transversely secured to the frame, substantially as described.

2. In a baby-walker, a frame comprising upright standards, parallel bars $a$ and shorter parallel bars $e$ joining the ends of said standards, cross-bars $a'$, $b'$, $c'$, also joining said standards, transverse braces $f$ secured to the shorter parallel bars $e$, and forming therewith a space $g$, parallel supports $i$ connecting pairs of said upright standards, a removable seat mounted on said supports beneath the space $g$, and segmental pieces or rockers secured to the shorter pair of said parallel bars, substantially as described.

In testimony that I claim the foregoing I have hereunto set my hand this 13th day of April, 1896.

JOSEPH H. THOMAS.

Witnesses:
ALFRED GARTNER,
DUNCAN M. ROBERTSON.